(12) United States Patent
David

(10) Patent No.: US 7,899,306 B2
(45) Date of Patent: Mar. 1, 2011

(54) SECURITY SYSTEM

(75) Inventor: Morgan William Amos David, Farnham (GB)

(73) Assignee: Sony United Kingdom Limited, Weybridge (GB)

( * ) Notice: Subject to any disclaimer, the term of this patent is extended or adjusted under 35 U.S.C. 154(b) by 1084 days.

(21) Appl. No.: 11/036,389

(22) Filed: Jan. 14, 2005

(65) Prior Publication Data

US 2005/0158031 A1  Jul. 21, 2005

(30) Foreign Application Priority Data

Jan. 16, 2004  (GB) .................. 0400972.6

(51) Int. Cl.
*H04N 5/93* (2006.01)
*H04N 9/80* (2006.01)
*H04N 5/76* (2006.01)
*H04N 5/222* (2006.01)

(52) U.S. Cl. ......... 386/281; 386/239; 386/248; 386/278; 348/231.6; 348/333.12

(58) Field of Classification Search .................. None
See application file for complete search history.

(56) References Cited

U.S. PATENT DOCUMENTS

| | | | |
|---|---|---|---|
| 5,293,462 A | | 3/1994 | Nishimoto et al. |
| 6,657,658 B2 * | | 12/2003 | Takemura ............ 348/207.99 |
| 2002/0101521 A1 * | | 8/2002 | Laaksonen .............. 348/232 |
| 2004/0201751 A1 * | | 10/2004 | Bell et al. ............. 348/231.99 |

FOREIGN PATENT DOCUMENTS

| | | |
|---|---|---|
| EP | 1 133 163 | 11/2001 |
| GB | 2 376 104 | 12/2002 |
| GB | 2 379 145 | 2/2003 |
| JP | 8-227453 | 9/1996 |

OTHER PUBLICATIONS

A. Menezes et al., "Handbood of Applied Cryptography", CRC Press, Inc., pp. 1997.

* cited by examiner

*Primary Examiner* — Marsha D Banks Harold
*Assistant Examiner* — Heather R Jones
(74) *Attorney, Agent, or Firm* — Oblon, Spivak, McClelland, Maier & Neustadt, L.L.P.

(57) ABSTRACT

A media data security system for rendering a secure media data file, having associated authentication data, for output comprises a data preparation unit operable with respect to a version of the media data file, having user controls for generating a list of desired render operations to be applied to the media data file; and a secure data reproducer arranged to receive the list of desired render operations from the data preparation unit and to render the secure media data file for output on the basis of the list of render operations, the secure data reproducer comprising: a data authenticator for detecting the authenticity of the secure media data file using the authentication data; and a data reproducer operable, if the data authenticator detects that the input data is authentic, to perform the list of desired render operations with respect to the secure media data file.

19 Claims, 4 Drawing Sheets

SECURITY SYSTEM

BACKGROUND OF THE INVENTION

1. Field of the Invention

This invention relates to security systems.

2. Description of the Prior Art

It is known to use recorded audio-video material (AV) as evidence in a legal proceeding, such as a criminal prosecution. This recorded AV could be, for example, AV recorded by closed-circuit-television (CCTV) cameras located within the premises of a shop, the recorded AV being used as evidence of a theft of goods from the shop. As another example, digital AV cameras may be used to record the activities occurring in the centre of a town or city, the recorded AV being used as evidence of the occurrence of a crime.

However, there is always the danger that the recorded AV could be tampered with or modified. Even if it is not tampered with, the fact that this is possible means that the validity of the AV data can be challenged. There is also the danger that the AV recording systems themselves are tampered with, for example by a criminal who does not wish his actions to be successfully captured by a camera.

It is important, during a legal proceeding, to be satisfied of the authenticity and integrity of any recorded AV that has been submitted as evidence Otherwise, decisions based on recorded AV, the authenticity or integrity of which is in doubt, may be unsound.

This invention provides a media data security system for rendering a secure media data file, having associated authentication data, for output, the system comprising:

a data preparation unit operable with respect to a version of the media data file, having user controls for generating a list of desired render operations to be applied to the media data file; and a secure data reproducer arranged to receive the list of desired render operations from the data preparation unit and to render the secure media data file for output on the basis of the list of render operations, the secure data reproducer comprising:

a data authenticator for detecting the authenticity of the secure media data file using the authentication data; and a data reproducer operable, if the data authenticator detects that the input data is authentic, to perform the list of desired render operations with respect to the secure media data file.

SUMMARY OF THE INVENTION

The invention allows evidence to be authenticated before it is presented in a legal proceeding, thereby providing confidence in the integrity of the evidence being presented. It is possible that only certain portions of the evidence are required for use in arguments during the legal proceeding and that these portions may need to be edited to highlight certain points. The invention allows lists of such render operations to be generated using a version of the evidence which may, for example be non-authenticatable; however, during the legal proceeding, the list of render operations is applied to the evidence that has been authenticated, thereby providing confidence in the integrity of the presented evidence.

This invention also provides a media data security method for rendering a secure media data file, having associated authentication data, for output, the method comprising the steps of:

a data preparation unit generating, with respect to a version of the media data file, a list of desired render operations to be applied to the media data file; and a secure data reproducer receiving the list of desired render operations from the data preparation unit and rendering the secure media data file for output on the basis of the list of render operations, the secure data reproducer:

detecting the authenticity of the secure media data file using the authentication data; and if the data authenticator detects that the input data is authentic, performing the list of desired render operations with respect to the secure media data file.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
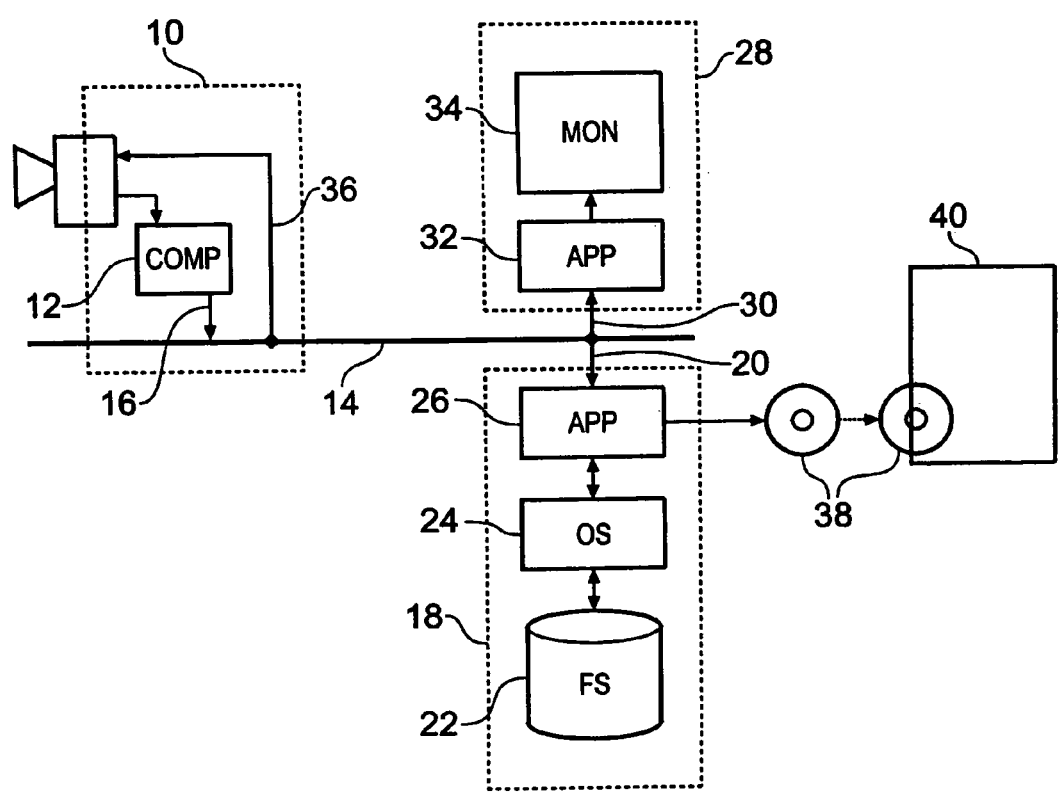
FIG. 1 schematically illustrates an AV system.

FIG. 1 schematically illustrates an AV system. An IP (Internet protocol) camera 10 comprises a microphone (not shown) and an AV compression unit 12 that compresses uncompressed digital AV generated by the IP camera 10 to form compressed digital AV. The AV compression unit 12 may operate according to any suitable compression algorithm, for example, the Motion Pictures Experts Group (MPEG) 2 standard (ISO/IEC-13818, see for example www.mpeg.org) and may operate to compress only the video material, leaving the audio uncompressed. The IP camera 10 is connected to a network 14 via a connection 16. It will be appreciated that there may more than one IP camera 10 connected to the network 14 and that they may be arranged to capture different "scenes", i.e. images and sounds at different physical locations. Each of the IP cameras 10 has its own IP address so that it can be uniquely identified. It will be appreciated that the IP camera 10 may be configured to capture only video material and not to capture any audio material.

An AV server 18 is also connected to the network 14 via a connection 20. Compressed AV is received by the AV server 18 from the IP camera 10. The AV server 18 may be, for example, a personal computer, and comprises a file system 22 (such as a hard disc drive or array) capable of storing received compressed AV, an operating system 24 controlling the file system 22 and an application program 26 running on the AV server. Under the control of the operating system 24 and the application 26, compressed AV received by the AV server 18 from the IP camera 10 is stored on the file system 22. The AV server 18 therefore acts as the main storage of the compressed AV. It will be appreciated that there may be more than one AV server 18 to store the compressed AV and that the need for a certain number of AV servers 18 may be determined by, for example, bandwidth constraints, backup requirements etc.

An AV client 28 is also connected to the network 14 via a connection 30. The AV client 28 runs an application program 32 and a monitor (display) 34. Under instruction from an operator, the application 32 may control the AV client 28 so that it receives compressed AV from the IP camera 10. The application 32 decompresses the compressed AV that it has received before rendering the AV captured by the IP camera on the monitor 34. In this way, the human operator of the AV client 28 can view what is currently being "seen" by the IP camera 10. If there is more than one IP camera 10 connected to the network 14, the application 32 may allow the operator to select a particular IP camera 10, or to display images from two or more cameras simultaneously.

Alternatively, under instruction from the operator, the application 32 may control the AV client 28 so that it receives compressed AV from the AV server 18. The AV client 28 therefore permits an operator to view both "live" AV direct from the IP camera 10 and AV recorded on the AV server 18.

It will be appreciated that the AV client 28 may comprise more than one monitor 34 and that they may be controlled by the application 32 (under instruction from the operator) to display AV from different sources (either the IP cameras 10 or the AV server 18). It will also be appreciated that there may be more than one AV client 28 connected to the network 14. Additionally, it will be appreciated that there may be no AV clients 28 connected to the network 14, the system being controlled via the application 26 running on the AV server 18.

The settings of the IP camera 10 (such as pan, tilt, zoom and exposure settings) may be pre-set. Alternatively, the IP camera 10 may comprise a control link 36. Control information may be delivered to the IP camera 10 from the AV client 28 via the network 14. The control link 36 receives the control information from the network 14 and the IP camera 10 responds to the control information accordingly (such as adjusting its zoom setting).

If the AV (or, more likely, a portion of the AV) stored on the AV server 18 is required as evidence in a legal proceeding (or for any other reason), then the application 26, under instruction from an operator, controls the AV server 18 to generate an evidence copy 38 of that portion of the AV. This AV evidence copy 38 could be, for example, stored on an optical disc, such as a Compact Disc (CD) or a Digital Video Disc (DVD). The AV evidence copy 38 is then delivered (for example by courier) to the appropriate recipient, for example, a court, a barrister, a solicitor, etc. shown generally as a recipient 40 in FIG. 1. It will be appreciate that, for a given legal proceeding, there may be more than one recipient 40, each of whom may request and receive one or more different AV evidence copies 38.

Figure 2:
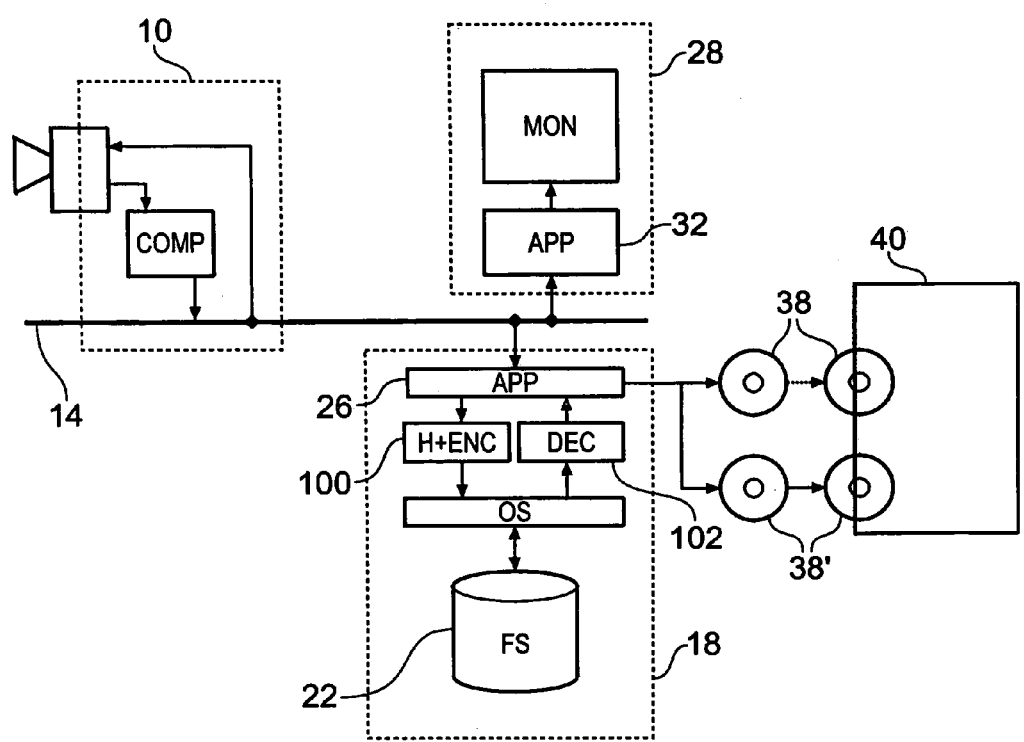
FIG. 2 schematically illustrates the AV system of FIG. 1 with additional security features.

FIG. 2 schematically illustrates the AV system of FIG. 1 with additional security features. These additional security features relate to a first stage of securing the system that protects the compressed AV once it has been received by the AV server 18.

The AV server 18 has a security module 100, which may be (i) implemented in software (and may then form part of the application 26), (ii) implemented in hardware or (iii) implemented as a combined software/hardware unit. One of the roles of the security module 100 is to encrypt the compressed AV that the AV server 18 receives from the IP camera 10. This allows the AV to be stored securely on the file system 22. Even if an attacker (a person wishing to destroy, corrupt or gain access to the stored AV) has access to the file system 22, the attacker will not be able to interpret the stored data since it is encrypted. The security module may operate according to any encryption algorithm, such as 3-DES and/or the Advance Encryption Standard (AES) (for both of which see http://csrc.nist.gov/CryptoToolkit/tkencryption.html).

The AV server 18 additionally comprises a decryption module 102 that operates to reverse the encryption provided by the security module 100. Accordingly, when an evidence copy 38 is required or when the AV client 28 requests AV from the AV server 18, the encrypted AV stored on the file system 22 is passed to the decryption module 102. The decryption module 102 outputs unencrypted compressed AV which may then be used to create an evidence copy 38 or may be sent to the AV client 28.

The management of the keys used by the security module 100 during the encryption process and the decryption module 102 during the decryption process may be handled in a standard way that is well known in this field of technology. For example, passwords, user identifications and access control can all be used to ensure that only those with permission to decrypt the encrypted AV stored on the file system 22 are able to do so.

The security module 100 also generates one or more hash values according to the compressed AV received by the AV server 18. The security module 100 may generate these hash values according to any hashing algorithm, for example, the Secure Hashing Algorithm (SHA) 1 (for which see http://csrc.nist.gov/CryptoToolkit/tkhash.html). Hash values are well known in this field of technology as a method of authenticating data, i.e. validating that data has not been tampered with. A hash value is a value that lies within a fixed range of values (e.g. all 40-bit numbers) that is derived from an input amount of data (which may be any number of bits long). This hash value is then said to represent the input data. A good hashing algorithm is very sensitive to the input data, so that a modification of a single bit of the input data will yield a substantially different hash value. As such, the hash value of modified data will, with a very high probability, not match the hash value of the original unmodified data. The validity of an amount of data can thus be ascertained by generating a hash value on that amount of data and comparing it with a hash value generated on the original data that is known to be correct. Additionally, with a good hashing algorithm, it is very difficult indeed to create an amount of false data which gives a hash value equal to the hash value of data known to be valid. Some hashing algorithms require the use of a secret key so that only authorised parties are able to generate the hash value. This prevents an attacker from modifying the input data, creating a modified hash value from the modified data and then attempting to pass-off the modified hash value as the original hash value in an attempt to provide evidence of authenticity for the modified data.

The security module 100 may derive a hash value from the received compressed AV in several ways. For example, the security module 100 may generate a hash value for each frame of video from the compression codewords used for that frame of video. These compression codewords could be, for example, variable length codewords that represent discrete cosine transform (DCT) coefficients, wavelet coefficients, header information, etc. As such, a modification to the data representing that frame can be detected. This hash value can then be embedded within the compressed data (for example by using spare user-data within the compressed data format). More preferably, in order to be able to detect the insertion or removal of frames from the compressed AV, hash values are calculated across sections of multiple frames, the sections over which the hash values are calculated being overlapping sections. This may, though, introduce extra latency in the processing of the security module 100, if, for example, an embedded hash value is dependent on a future frame. It will be appreciated that there exist a variety of ways of generating hash values and that generation on a frame-by-frame basis or group-of-frames-by-group-of-frames basis are merely examples. Additionally, hash values may be generated on and/or embedded within the audio data.

As with the encryption and decryption of the compressed AV according to the security module 100 and the decryption module 102 respectively, the management of key information for the generation of hash values is carried out according to standard methods well-known in this field of technology.

Once the hash values have been embedded into the compressed AV, the compressed AV is encrypted by the security module 100 before being stored on the file system 22.

When an evidence copy 38 is delivered to a recipient 40, the recipient 40 can generate hash values according to the same algorithm as used by the security module 100. If the hashing algorithm requires the use of key information, then the recipient must have access to this key information. As mentioned, this is handled by a standard key-management technique well known in this field of technology. The recipient 40 can compare the hash values that the recipient 40 has generated with the hash values that were embedded into the compressed AV by the security module 100. If the hash values match, then the recipient 40 can be satisfied that the evidence copy 38 has not been modified during delivery from the AV server 18 to the recipient 40; otherwise the recipient 40 will know that a modification has occurred and may then take appropriate action (for example, re-requesting an evidence copy 38).

Furthermore, the security module 100 may insert one or more security headers into the compressed AV, the security header containing information such as camera data (e.g. IP-address) and the date/time of recording. This header may be subsequently encrypted by the security module 100. The recipient 40 may use the information contained in these security headers to help determine the authenticity of an evidence copy 38 that has been received.

As a further method of authenticating the evidence copy 38 received by the recipient 40, it is possible for another evidence copy 38' to be sent to the recipient 40 (preferably by an alternative route). The recipient 40 can then compare the two evidence copies 38 and 38' to determine whether one of them has been modified. It will be appreciated, of course, that any number of evidence copies 38 may be sent to the recipient for this purpose.

Naturally, in order to help ensure that an attacker is not able to gain unauthorised access to the compressed AV, the applications 26 and 32, running on the AV server 18 and the AV client 28 respectively, are implemented according to standard security coding practices. This is particularly important when the applications 26 and 32 are being run on standard hardware (such as PCs) and the operating system 24 (and the analogous operating system of the AV client 28, not shown) is a well-known operating system, such as Windows or Linux, as these receive a lot of attention from the attacker "community".

Figure 3:
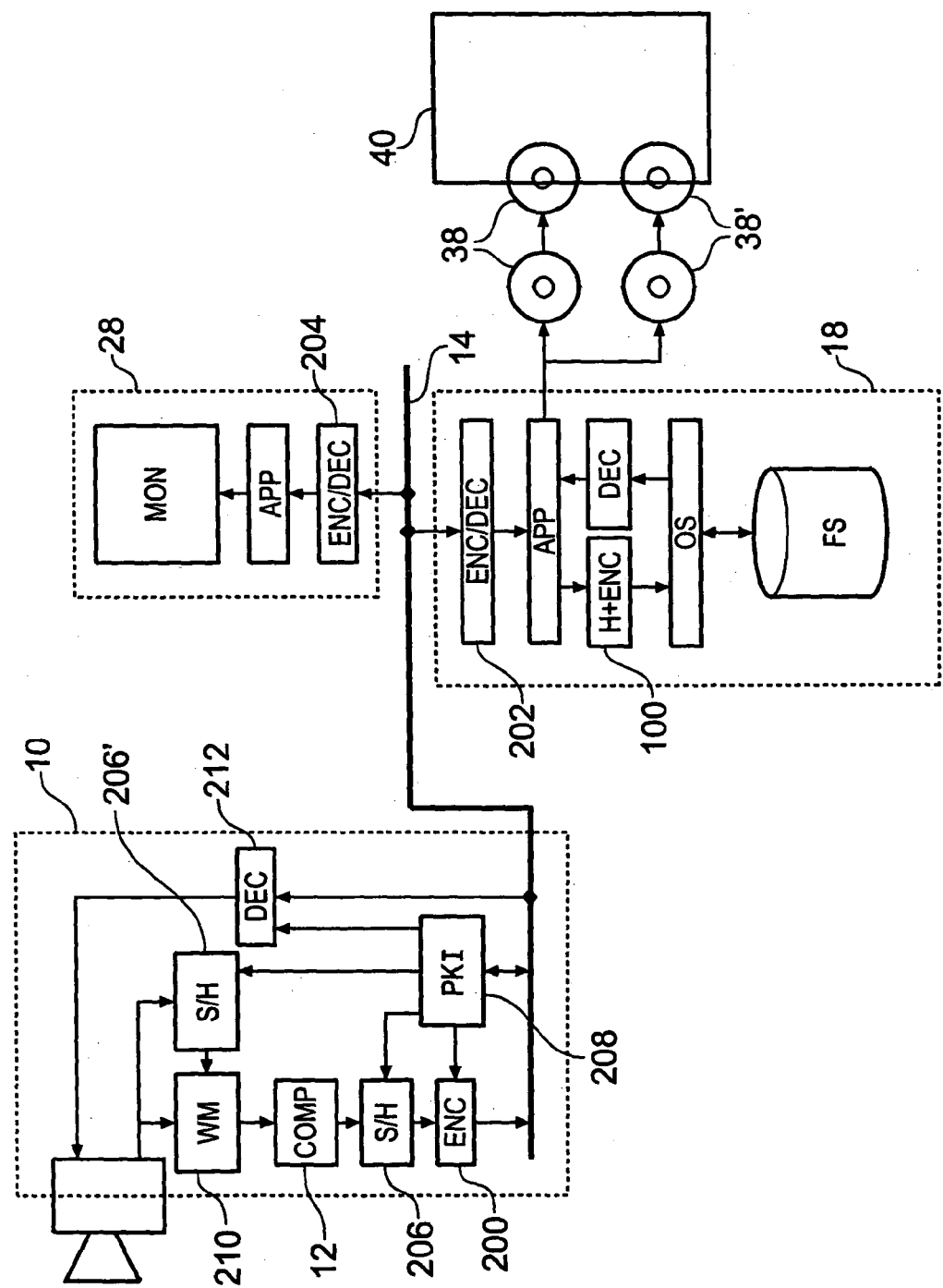
FIG. 3 schematically illustrates the AV system of FIG. 2 with additional security features.

FIG. 3 schematically illustrates the AV system of FIG. 2 with additional security features. These additional security features relate to a second stage of securing the system in which protection for the AV begins within the IP camera 10.

The data being transferred across the network 14 is encrypted by a network encryption module 200 of the IP camera 10, a network encryption module 202 of the AV server 18 or a network encryption module 204 of the AV client 28. The network encryption modules 202 and 204 are also arranged to decrypt encrypted data being transferred across the network 14. The encryption algorithms and protocols used to secure the data on the network 14 may be any appropriate algorithms and protocols, for example, IPSec (for which see http://www.ietf.org/html.charters/ipsec-charter.html). The processing performed by the network encryption modules 200, 202 and 204 may be implemented in software, hardware, or a combination of software and hardware. In particular, if the AV server 18 receives many compressed AV streams from various IP cameras 10 and/or supplies many compressed AV streams to various AV clients 28, then the aggregate bandwidth for the AV server 18 may be relatively high and the encryption and decryption processing by the network encryption module 202 may require hardware acceleration.

The flow of data across the network 14 can therefore be secured, thereby preventing an attacker from accessing the compressed AV data communicated across the network 14. Additionally, security protocols such as IPSec make the analysis of network traffic much more difficult and helps to prevent so-called "man-in-the-middle" attacks in which data communicated on the network 14 is first received by an attacker (who may then modify, analyse etc. the data) before being distributed to the intended recipient.

In a similar manner to the AV server 18, it is advantageous to provide the IP camera 10 with security features that help prevent (or at least allow detection of) modification of the compressed AV. As such the IP camera 10 has an authenticating module 206. The authenticating module 206 may insert hash values into the compressed AV in a similar manner to the security module 100 and modification of the compressed AV can be detected as described with reference to the security module 100. An alternative to using hash values is to use digital signatures. These are similar to hash values in that (i) they comprise a relatively small amount of data that is representative of the data to be authenticated (ii) they are sensitive to changes in the data to be authenticated and (iii) it is difficult to create data that yields a specific signature or hash value. However, digital signatures rely on public key (or asymmetric) cryptography. Digital signatures and public key cryptography are well known in this field of technology and will not be described in detail here (for more information see "The Handbook of Applied Cryptography" by A. J. Menezes et al.). As an alternative to, or in addition to, inserting hash values into the compressed AV, the authenticating module 206 may be arranged to provide one or more digital signatures for one or more of sections of the compressed AV (in a similar manner as described for the hash values).

In order to generate digital signatures, the IP camera 10 has a PKI (public key infrastructure) module 208 which is arranged to store certain public and private key information in a secure manner. For example, at manufacture, each IP camera 10 may be provided with (or may generate by itself) a public key/private key pair to be used for digital signatures. The private key is held securely by the IP camera 10 in the PKI module 208 and is used by the authenticating module 206 to generate digital signatures. The corresponding public key can be obtained from the IP camera 10, for example by access over the network 14, and may be used at a later stage for authenticating the digital signatures. As a public key/private key pair is specific to a particular IP camera 10, it is possible not only to authenticate the compressed AV but also to authenticate that it originated with a particular IP camera 10.

The use of public key cryptography is preferably supported by the use of digital certificates issued by and authenticated according to a certification authority. Digital certificates and certification authorities are well known in this field of technology and will not be described in detail here (for more details, see "The Handbook of Applied Cryptography" by A. J. Menezes et al.). The system shown in FIG. 3 may therefore make use of digital certificates according to either a third-party certification authority or an internally-operated certification authority. Digital certificates allow the details and ownership of public keys to be authenticated.

The security provided over the network 14 by the encryption and decryption according to the encryption modules 200, 202 and 204 may additionally make use of asymmetric encryption in order to, for example, authenticate the identity of the communicating entities (namely the IP cameras 10, the AV servers 18 and the AV clients 28), or to establish so-called "session keys" that are used throughout the lifetime of an encryption session. As such, each entity on the network 14 (namely the IP cameras 10, the AV servers 18 and the AV clients 28) has (i) its own private keys held securely by the entity and (ii) public keys (preferably contained within digital certificates so that they can be authenticated) that are available to all other entities on the network 14. For example, the PKI module 208 may be able to download and store a table of public keys via access to the network 14. The AV server 18 and the AV client 28 may make use of a PKI module (not shown) similar to the PKI module 208.

In order to provide further authentication measures, the IP camera 10 additionally has a watermarking module 210 that may apply watermarks to the AV before it is compressed.. Watermarking is well known in this field of technology and will not be described in detail (for more information, see www.watermarkingworld.org). In brief though, watermarking involves modifying the AV (preferably in an imperceptible manner) so as to embed so-called "payload data" into the AV.

The watermarking module 210 may be arranged to embed a so-called "fragile watermark". Fragile watermarks possess the property that, if modifications are made to the AV, then the fragile watermark cannot be decoded. Additionally, it is known for some fragile watermarks to possess the property that, if modifications are made to only certain portions of the AV (either certain temporal portions and/or certain spatial portions) then the fragile watermark cannot be decoded from those portions, but can be decoded from the remaining portions. This enables a fragile watermark decoder to determine which portions of the AV have been modified. It will be appreciated that the watermarking module 210 may apply a fragile watermark according to any appropriate algorithm. Many fragile watermarking algorithms require the generation of either hash values or digital signatures. Accordingly, an authenticating module 206' provides the watermarking module 210 with either hash values or digital signatures. The authenticating module 206' may be separate from the authenticating module 206; alternatively, the two authenticating modules 206 and 206' may be the same. However, it is possible that the PKI unit 208 has more than one public key/private key pair for the IP camera 10, and the private key used by the authenticating module 206 may be different from the private key used by the authenticating module 206'.

An alternative form of watermarking is the so-called "robust watermarking", which has the property that the payload data embedded can still be decoded from the watermarked AV data even if the AV data has undergone a degree of processing (such as data compression, re-sizing, cropping, etc.) The watermarking module 210 may therefore be arranged embed a robust watermark into the AV in addition to or as an alternative to embedding a fragile watermark. For example, a robust watermark embedded into the AV by the watermarking module 210 may contain information such as the identity of the IP camera 10 and/or the date/time of the AV capture. During subsequent use of the AV data, the absence of this watermark provides evidence that either the AV did not originate with the IP camera 10 or that the AV has been modified sufficiently (and is therefore not representative of the original AV) so as to render the robust watermark not decodable.

If the watermarking module 210 applies a fragile watermark to the AV, then it is preferable for the compression algorithm used by the AV compression unit 12 to be a so-called lossless compression algorithm (i.e. the compression afforded by the AV compression unit 12 is completely reversible) so that the fragile watermark is not destroyed. Alternatively, watermarking algorithms (both fragile and robust) that work on compressed AV (as opposed to baseband AV) are well known. The IP camera 10 may therefore have an additional watermarking module (not shown) that embeds watermarks (fragile and/or robust) into the compressed AV.

The IP camera 10 additionally has a control information decryption module 212 that is arranged to decrypt control information sent to it across the network 14. It is known for some IP cameras 10 to respond to control commands only if, for example, a correct password or a user identification has been received. Additionally, some IP cameras 10 allow for the establishment of user profiles, with certain control commands only being accessible to users with a profile of a sufficient access level. However, the commands sent to the IP camera 10 should be encrypted, as otherwise an attacker may be able to analyse the network traffic and determine how to generate unauthorised control commands. As discussed earlier, the traffic on the network 14 can be encrypted according to, for example, the IPSec protocol. The control information decryption module 212 therefore performs the decryption necessary when control information is received by the IP camera 10. If asymmetric encryption is being used, the control information decryption module 212 may make use of key information provided to it by the PKI module 208.

The system according to FIG. 3 provides many techniques for securing both the storage of and distribution across the network 14 of AV. Additionally, the system according to FIG. 3 provides further security through authentication, which includes authentication not only of the AV itself, but also that the entities communicating across the network 14 are actually the entities they are purporting to be. It will be appreciated that some of these security measures may be excluded from the system and an associated level of security is attained.

It is important, though, to ensure that, once an evidence copy 38 is made and delivered to a recipient 40 (for example for use in a legal proceeding), then the AV on the evidence copy 38 is not subject to an attack. It is therefore important that, when the AV evidence copy 38 is used, it is possible to be confident that the AV presented has not been modified (for example, to exclude or remove pertinent information).

Figure 4:
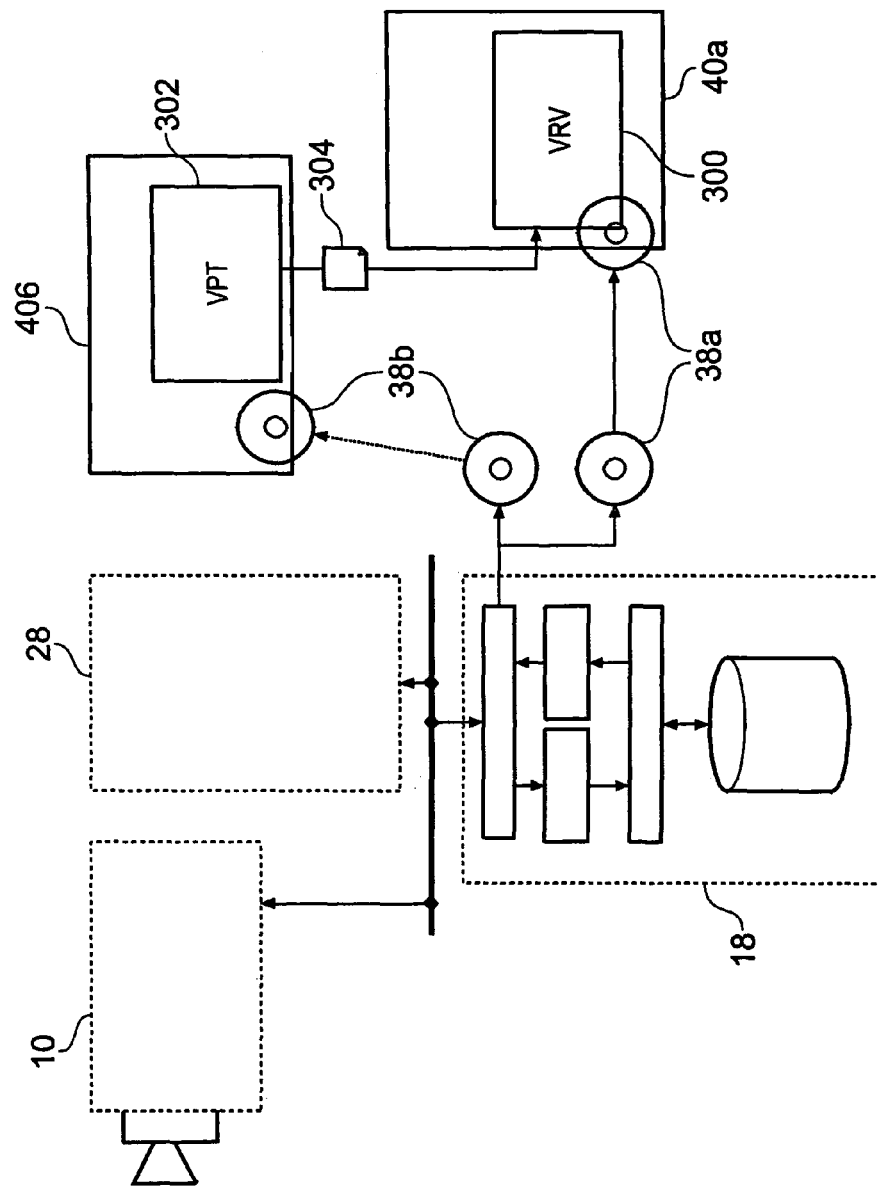
FIG. 4 schematically illustrates the AV system of FIG. 3 with additional security features.

FIG. 4 schematically illustrates the AV system of FIG. 3 with additional security features. These additional security features relate to a third stage of security that concerns the export of evidence copies 38.

A secured evidence copy 38a is provided to a trusted recipient 40a, such as a court in a legal proceeding. The secured evidence copy 38a contains the authentication information (such as hash values and digital signatures) and may additionally be encrypted to increase security. The trusted recipient 40a comprises a verified reference viewer (VRV) 300. The purpose of this will be described later.

Other recipients (such a defence or prosecution lawyer) 40b receive evidence copies 38b, which may be unsecured (e.g. unencrypted), full resolution AV. The evidence copies 38b may be used by the recipients 40b for various purposes, for example, for preparing arguments in a legal proceeding. The recipient 40b may decide that certain editing of the received evidence copy 38b is necessary for a specific purpose (for example, to highlight a specific point in an argument). Such editing may include, for example, AV selection and annotation, zooming (in and out), cropping, picture enhancement, noise reduction, slow-motion playback, pausing, split-screen comparisons, etc., although it will be appreciated that many more operations may be made available. The recipient 40b is therefore provided with a verified preparation tool (VPT) 302. The VPT 302 is an application (either software, hardware or a combination of both) that has been designed to provide resistance to malicious attacks. The VPT 302 has a rendering and editing component (not shown) that the recipient 40b uses to perform the various editing/rendering operations mentioned above. The recipient 40b can therefore prepare AV evidence for later use. Preferably, the VPT 302 permits real-time rendering of the evidence copy 38b according to the edit decisions made by the recipient 40b.

The VPT 302 also has an edit decision list generation component (not shown). Once the recipient 40b has finalised the edit decisions required on the evidence copy 38b, the edit decision list generation component of the VPT 302 generates an evidence presentation list (EPL) 304. The EPL 304 contains details about all of the edit instructions required by the recipient 40b. The EPL 304 may contain one or more groups of edit instructions, each group containing one or more edit instructions that are intended to be performed sequentially. For example, the EPL 304 may consist of the following data:

Group of instructions 1:
Play AV from start timecode 01:00:20:13 to end timecode 01:00:22:02;
Play AV from start time code 01:00:22:03 to end timecode 01:00:25:18 at half-speed.
Group of instructions 2:
Play AV from start time code 02:13:56:10 to end timecode 02:18:00:01 with noise reduction and edge enhancement;
Play AV from start time code 02:18:00:02 to end timecode 02:19:50:22 with noise reduction and edge enhancement and zoomed in to the top left corner with a scale factor of 1.8;
Play AV from start time code 02:19:50:23 to end timecode 02:22:22:22 with noise reduction and edge enhancement and then pause at time code 02:22:22:22.

In the above example, the first group of instructions may be used by the recipient 40b during a first argument in a legal proceeding and the second group of instructions may be used by the recipient 40b during a subsequent argument in the legal proceedings. It will be appreciated that any number of groups of instructions may be contained in the EPL 304. It will also be appreciated that the VPT 302 may generate more than one EPL 304.

Optionally, the VPT 302 includes in the EPL 304 authentication data (such as a digital signature). As such the EPL 304 can be authenticated, both in terms of the information that it contains and its origin (i.e. originating from the recipient 40b). This may require the use of a trusted key management system or a PKI system (not shown) so that the trusted recipient 40a can independently authenticate the EPL 304. Furthermore, the VPT 302 may encrypt the EPL 304.

It will be appreciated that, if the VPT 302 is implemented at least in part in software, then this software may be either a stand-alone software application or a plug-in for an existing software application in a known manner. For example, there exist many video editing software applications (some of which rely on hardware acceleration) and the VPT 302 may be implemented as a software plug-in that (i) makes use of the video editing functionality of the video editing software application and (ii) additionally provides functionality to generate the EPL 304, authenticate it and encrypt it. A VPT 302 implemented as a software plug-in may restrict the number of video editing/rendering operations available via the video editing software application to the recipient 40b so that only those operations permissible in a legal proceeding are made available to the recipient 40b. One example of such a video editing software application is the Adobe Premier™ product.

The EPL 304 does not contain any AV content.

The EPL 304 is sent to the trusted recipient 40a for later use within the VRV 300. The VRV 300, like the VPT 302, is an application (either software application, software plug-in, hardware or a combination of software and hardware) that has been designed to be provide resistance to malicious attacks. The VRV 300 has an authentication component that is able to determine the authenticity of the secured evidence copy 38a and the EPL 304. This authentication may include the validation of hash values and digital signatures, and the reading of fragile and robust watermarks, depending on the particular form of authentication data associated with the evidence copy 38a. The VRV 300 additionally contains a decryption component so that, if the secured evidence copy 38a or the EPL 304 is in encrypted form, the VRV 300 can decrypt it. The management of the keys for the decryption and authentication is, as mentioned, handled by a trusted key management system or a PKI system (not shown) in a known manner.

The authentication process may be done in front of a group of witnesses who can then assert that they have witnessed that the secured evidence copy 38a that is to be used in the legal proceedings is authentic. Additionally, if watermarking has been used to embed information into the AV, then the embedded information may be presented as additional evidence (for example, the identity of the IP camera 10 or the time/date of the capture of the AV).

When instructed, the VRV 300 examines the EPL 304 provided to it by the recipient 40b and renders the AV from the secured evidence copy 38a according to the edit instructions of one of the groups of instructions in the EPL 304. As the authenticities of the secured evidence copy 38a and the EPL 304 have been ascertained, the AV evidence rendered by the VRV 300 can be presumed to be genuine with a high degree of certainty. In contrast to this, if the recipient 40b had actually prepared an edited version of the evidence copy 38b for use in the legal proceedings, the authenticity of this edited version may be cast in doubt as the recipient 38b or someone else may (either deliberately or accidentally) have made modifications.

Whilst this embodiment has be described by reference to providing AV evidence to a legal proceeding, it will be appreciated that it is not restricted to evidence for legal proceedings, but is, in fact, applicable to any AV system that requires AV to be recorded and delivered in a secure manner, for example, when supplying medical data.

Additionally, whilst this embodiment has been described by reference to AV data, it will be appreciated that it is applicable to other forms of data, such as text documents and generic data that are equally susceptible to some of the above mentioned security techniques (such as encryption, hash values, digital signatures and watermarking).

It will be appreciated that where features of the embodiments described above are implemented at least in part by software, such software (or components of it such as plug-ins) may be provided via a storage medium such as a disk storage medium, via a transmission medium such as a network or internet connection, or combinations of these.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

I claim:

1. A media data security system for rendering a media data file for output, said system comprising:
   a data preparation unit configured to generate a list of render operations with respect to a first copy of said media data file to be applied to said media data file, said list of render operations being separate from said media data file, said media data file being associated with authentication data; and
   a secure data reproducer configured to receive only said list of render operations from said data preparation unit and to render a second copy of said media data file for output on the basis of said list of render operations, said secure data reproducer including a data authenticator configured to detect whether said media data file is authentic, by using said authentication data,
   the secure data reproducer configured to perform said render operations with respect to the second copy of said media data file, from the received list of render operations, in response to said data authenticator detecting that the second copy of said media data file is authentic.

2. The system according to claim 1, wherein said data authenticator is configured to detect whether said media data file is authentic, by using said authentication data, which represents digital signature data derived in respect of at least a portion of said media data file.

3. The system according to claim 1, wherein said data authenticator is configured to detect whether said media data file is authentic, by using said authentication data, which represents hash data derived in respect of at least a portion of said media data file.

4. The system according to claim 1, wherein said data authenticator is configured to detect whether said media data file is authentic, by using said authentication data, which comprises watermark data encoded within at least a portion of said media data file.

5. The system according to claim 1, wherein said data reproducer is configured to decrypt the media data file, said media data file being encrypted.

6. The system according to claim 5, wherein the data preparation unit is configured to generate the list of render operations with respect to the version of said media data file, which is unencrypted.

7. The system according to claim 1, wherein the data preparation unit is configured to generate the list of render operations to be applied to said media data file, which represents at least one of video and audio data.

8. The system according to claim 7, wherein the data preparation unit is configured to generate the list of render operations to be applied to said media data file, which represents at least video data, said render operations comprising one or more operations selected from the group consisting of: selecting temporal portions for display, image cropping, image zooming, image enhancement, noise reduction, replay speed variations, and display of multiple images on a single display screen.

9. The system according to claim 1, further comprising a removable storage medium configured to store said media data file.

10. The system according to claim 9, wherein said removable storage medium is further configured to store at least a component of said authentication data.

11. The system according to claim 10, wherein the data authenticator is configured to detect whether said media data file is authentic, by using said authentication data, which includes an additional data component not stored on said removable storage medium.

12. The system according to claim 1, wherein
   the data authenticator is further configured to detect whether the list of render operations is authentic, by using independent authentication data included in the list of render operations, and
   the data reproducer is configured to perform the render operations with respect to the media data file, when the data authenticator detects that both the media data file and the list of render operations is authentic.

13. A security arrangement, comprising:
   a video data server configured to connect to one or more video cameras, to handle video data from said video cameras, and to prepare a secure media data file and associated authentication data; and
   a system according to claim 1 for rendering said secure media data file.

14. The arrangement according to claim 13, further comprising the one or more video cameras, which are connected to said video data server.

15. A media data security method for rendering a media data file for output, said method comprising:
   generating, with a data preparation unit, a list of render operations with respect to a first copy of said media data file to be applied to said media data file, the list of render operations being separate from said media data file, said media data file being associated with authentication data;
   receiving from said data preparation unit only said list of render operations;
   rendering, with a secure data reproducer, a second copy of said media data file for output on the basis of the list of render operations, the rendering including detecting, with a data authenticator, whether said media data file is authentic, by using said authentication data; and
   performing, with a data reproducer, the render operations with respect to the second copy of said media data file, from the received list of render operations, in response to it being detected that the second copy of said media data file is authentic.

16. A tangible, computer-readable medium including computer executable instructions, wherein the instructions, when executed by a processor, cause the processor to perform a method comprising:
   generating, with a data preparation unit, a list of render operations with respect to a first copy of a media data file to be applied to said media data file, the list of render operations being separate from said media data file, said media data file being associated with authentication data;
   receiving from said data preparation unit only said list of render operations;
   rendering, with a secure data reproducer, a second copy of said media data file for output on the basis of the list of render operations, the rendering including detecting, with a data authenticator, whether said media data file is authentic, by using said authentication data; and
   performing, with a data reproducer, the render operations with respect to the second copy of said media data file, from the received list of render operations, in response to it being detected that the second copy of said media data file is authentic.

17. The medium according to claim 16, wherein the generating is performed by a video editing application program and a software plug-in arranged to co-operate with said video editing application program.

18. The medium according to claim 16, wherein the generating is performed by a software plug-in arranged to co-operate with a video editing application program.

19. A media data security system for rendering a media data file for output, said system comprising:

means for generating a list of render operations with respect to a first copy of said media data file to be applied to said media data file, said list of render operations being separate from said media data file, said media data file being associated with authentication data; and means for receiving only said list of render operations from said means for generating, and for rendering a second copy of said media data file for output on the basis of said list of render operations, said means for receiving including means for detecting whether said media data file is authentic, by using said authentication data, the means for receiving performing said render operations with respect to the second copy of said media data file, from the received list of render operations, in response to said means for detecting detecting that the second copy of said media data file is authentic.

* * * * *